W. L. SPENCE.
STEERING MECHANISM FOR VEHICLES.
APPLICATION FILED JUNE 16, 1921.
1,393,981.
Patented Oct. 18, 1921.
2 SHEETS—SHEET 1.
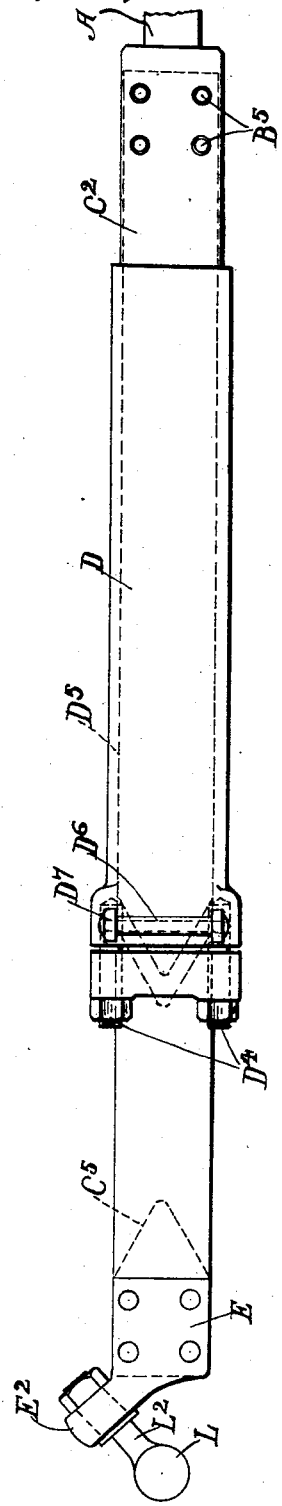
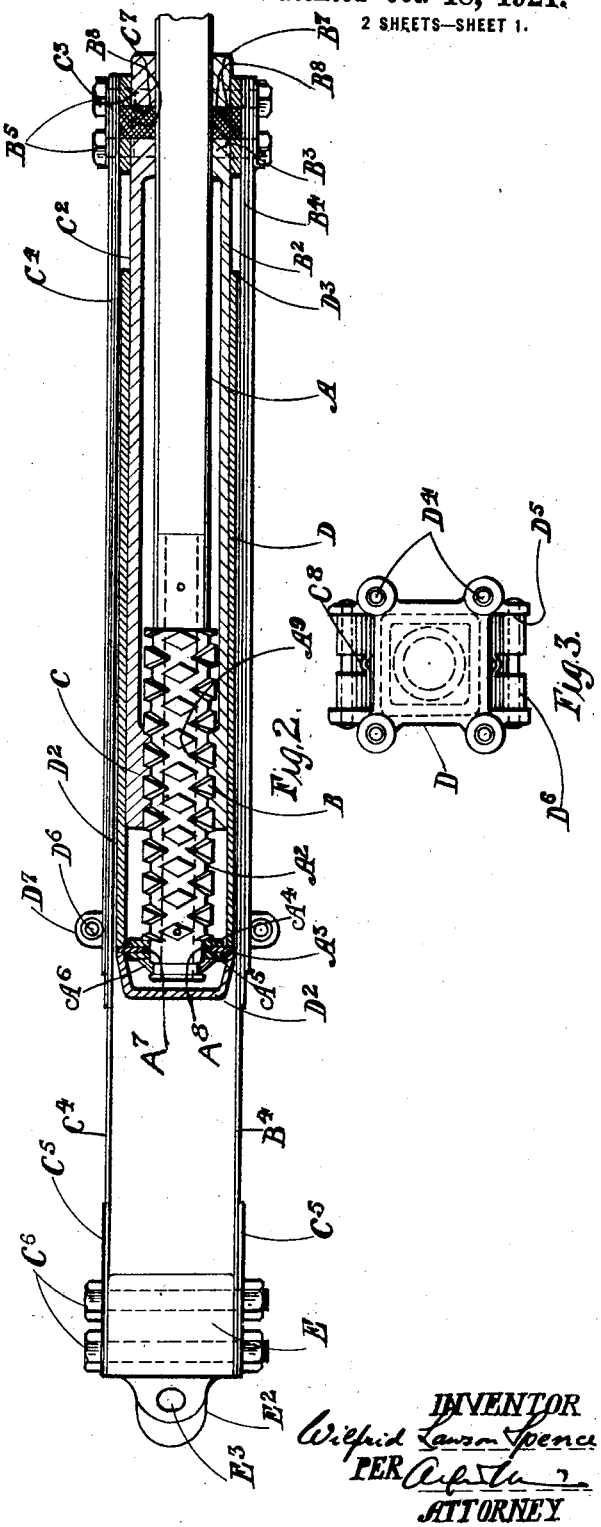

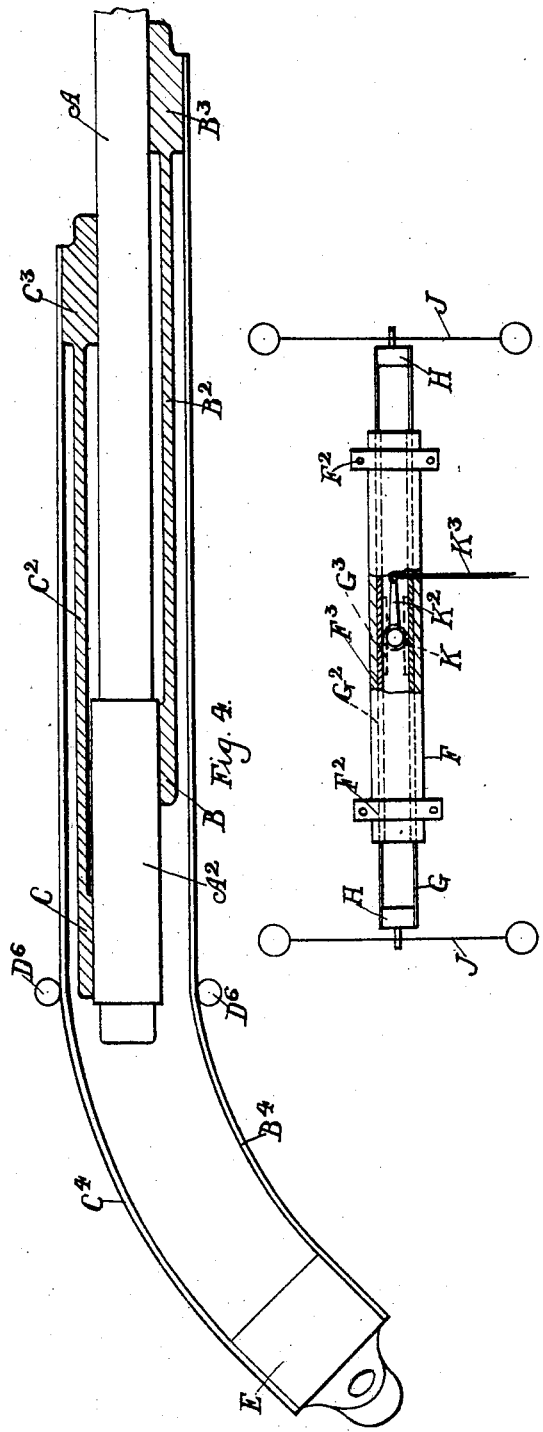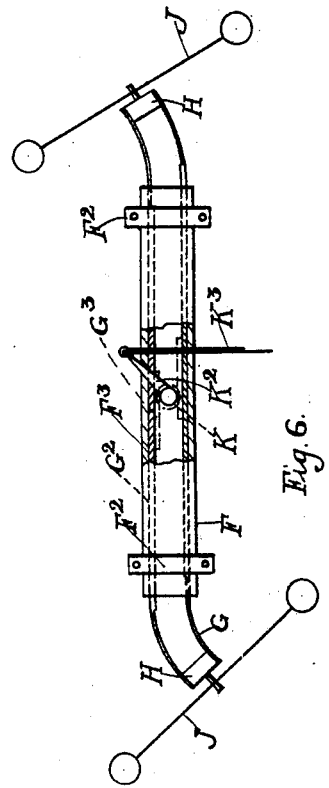

UNITED STATES PATENT OFFICE.

WILFRID LAWSON SPENCE, OF EDINBURGH, SCOTLAND.

STEERING MECHANISM FOR VEHICLES.

1,393,981.  Specification of Letters Patent.  Patented Oct. 18, 1921.

Application filed June 16, 1921. Serial No. 477,994.

*To all whom it may concern:*

Be it known that I, WILFRID LAWSON SPENCE, a subject of the King of England, residing at Edinburgh, Scotland, have invented certain new and useful Improvements in Steering Mechanism for Vehicles, (for which I have filed an application in England, April 12, 1920, Serial No. 10,115,) of which the following is a specification.

This invention relates to steering mechanism for vehicles, and it has for its objects to avoid the use of pivots, hinges, and the like for the movable parts thereby minimizing wear and backlash, and to inclose the operating gear in a lubricant chamber thereby to insure its effective lubrication and to screen it from dirt and moisture.

The invention broadly comprises a rigid member or support, and a member which is to be moved relatively thereto, having attached to it a pair of spring blades connected to an operating mechanism in such manner that relatively to one another the spring blades move in opposite directions thereby causing a displacement of the member which results in its being moved in a curved path about either side of its mid position.

In the accompanying drawings which illustrate the manner of carrying out the invention.

Figure 1 is a side elevation of the mechanism as employed in conjunction with the steering pillar of a motor vehicle, the spring blade nearest to the observer being removed for clearness, and the pillar being shown for convenience horizontally instead of inclined, Fig. 2 is a sectional plan of Fig. 1, showing the mechanism in its middle or normal position, Fig. 3 is an end view omitting for clearness the movable part to which the spring blades are attached, Fig. 4 is a diagrammatic plan with the mechanism in its extreme position upon one side of its normal position, and Figs. 5 and 6 are diagrammatic plans showing a modification of the device and its employment to operate the steerable wheels upon the front axle of a vehicle, one view showing the wheels in their mid position and the other locked over.

Like letters indicate like parts throughout the drawings.

The steering pillar is indicated at A carrying at one end the steering wheel (not shown), and at the other end a combined right and left handed screw $A^2$, in which for convenience the threads are arranged to cross one another. Engaging with these threads are half nuts B and C, one of which is right handed and the other left handed, and these nuts are adapted, when actuated, to move endwise in opposite directions in a casing D of non-circular interior section, (preferably square), forming a guide member in which the half nuts are fitted so that they cannot rotate with the screw, but can move axially along it.

The casing D is fixed to a stationary part, and is closed at its lower end $D^2$, but open at its upper end $D^3$, from which project extensions $B^2$ and $C^2$ of the half nuts B and C. The respective ends of these $B^3$ and $C^3$ on one side seat on the steering pillar A and upon the opposite side receive and have attached to them by the setscrews $B^5$ the ends of spring blades $B^4$, $C^4$, which extend backwardly and freely through channels $D^2$ in the casing D and some distance beyond it, for attachment, one on each side of a nose piece E, constituting the member to be moved relatively to the rigid member here represented by the screw $A^2$.

The attachment of the spring blades to the nose piece is reinforced by means of plates $C^5$ through which the securing bolts $C^6$ extend. A lug $E^2$ is carried by the nose piece, and is pierced at $E^3$ by a hole through which the stem $L^2$ attached to a ball L forming part of a ball and socket joint (not shown) can extend. The angle of this lug $E^2$ to the plane of flexure of the spring blades $B^4$, $C^4$ in conjunction with the angle in which the steering column inclosing the pillar A is set on the vehicle, is such that the ball stem is substantially vertical, and is adapted, when the spring blades $B^4$, $C^4$ are bent, to be moved in positions parallel to itself. It will be observed, that by reason of the inclination of the steering column when located on the vehicle, lubricant can be retained within the ball socket and within the casing D to surround the screw $A^2$, notwithstanding that its end $D^3$ is open.

The action of the gear will be readily seen from a consideration of the movements which take place when the steering wheel is rotated. It will be evident that as the nuts B and C have threads which for one are left handed and for the other right handed, they will be thrust by rotation of the screw in opposite directions within the casing D, and thus one of the spring blades $B^4$, $C^4$ will receive a push and the other a pull, thereby causing the nose piece E to take up a position such as that shown in Fig. 4 on one or other side of its mid-position, imparting to the ball L which it carries a movement to the right or left side of the vehicle, so that a drag link from this ball can be attached to the transverse coupling rod employed to connect the pair of steerable wheels of the vehicle.

A thrust washer $A^3$ for the screw $A^2$ is provided within the casing D and can be secured in place by making the end part $D^2$ detachable and securing the latter in place by means of the studs $D^4$. On each side of the washer $A^3$ are rotatable thrust washers $A^4$, $A^5$ separated by a spacer ring $A^8$ slightly thicker than the thrust washer $A^3$ and located in the latter's central aperture. Thus the thrust washers grip on the spacer ring, one bearing on a shoulder on the screw $A^2$, and the latter being backed up by a "circlip" washer $A^6$ engaging in a groove $A^7$ in the screw. The latter may be made hollow as at $A^4$ to increase the space for lubricant within the casing D. The spring blades are strengthened by longitudinally corrugated plates $C^8$ or other means where required to be rigid in the channels $D^2$, and the latter may be formed in the outer walls of the casing D, the blades being, if desired, retained therein by means of cross members such as the rivets $D^6$ extending through lugs $D^7$ in the side of the grooves.

The application of the invention direct to the steerable wheels of the vehicle is shown in Figs. 5 and 6, the former showing the wheels in the normal position, and the latter when locked over to one side. The front axle F is a rigid bar carrying the lugs $F^2$ for attachment of the usual vehicle springs, and is provided with load supporting guide ways $F^3$, (preferably constituted by anti-friction rollers), for the spring blades G, which latter extend from the block H carrying the stub axle of one wheel J to the corresponding block carrying the other. The portions $G^2$ of the blades guided along the axle are stiffly formed, or if desired may be separately formed and have the blades attached to them, the flexible portion G being near to the wheels, and upon the stiff portions $G^2$ are formed rack teeth $G^3$ adapted to mesh respectively with a rack pinion K operated in any convenient manner from the steering wheel, as for example by the lever $K^2$ to which is attached the link $K^3$.

As will be evident when the pinion E is rotated the spring blades upon one side of the wheel axis are moved in one direction and those on the other side are moved in the opposite direction, thereby causing them to bend near their attachment to the members carrying the wheel axles, and thus to effect the steering action in the appropriate manner upon both wheels simultaneously.

What I claim as my invention and desire to secure by Letters Patent of the United States is:—

1. In steering mechanism for vehicles, the combination of a rigid member, a member to be moved relatively to the rigid member, a pair of spring blades attached to said member to be moved, operating mechanism carried by said rigid member and adapted to slide said spring blades relatively in opposite directions, and guides for said operating mechanism, substantially as set forth.

2. In steering mechanism for vehicles, the combination of a rigid member, a member to be moved relatively to the rigid member, a pair of spring blades attached to said member to be moved, one on each side thereof, operating members for said spring blades, guides for said operating members adapted to guide them endwise, and so located that between them and the member to be moved the blades, for a portion of their length, are free to bend on each side of a mean position, and means adapted to slide said operating members relatively in opposite directions, substantially as set forth.

3. In steering mechanism for vehicles, the combination of a rigid member, a member to be moved relatively to the rigid member, a pair of spring blades attached to said member to be moved, one on each side thereof, and free to bend on each side of a mean position, a rotatable member carrying two screws, one right handed and the other left handed, nut members attached to each spring blade to engage respectively said screws thereby to impart endwise movements to the spring blades in opposite directions, and guide members adapted to guide said nuts, substantially as set forth.

4. In steering mechanism for vehicles, the combination of a rigid member, a member to be moved relatively to the rigid member, a pair of spring blades attached to said member to be moved, one on each side thereof, and free to bend on each side of a mean position, a rotatable member carrying two screws, one right handed and the other left handed, nut members attached to each spring blade to engage respectively said screws, a casing of non-circular section forming a guide member in which said nut members are adapted to slide non-rotatably, said casing closed at its lower end to form a lubricant chamber, and extensions of said nuts projecting from the upper end of said chamber for attachment to said spring blades, substantially as set forth.

5. In steering mechanism for vehicles, the combination of a rigid member, a member to be moved, comprising a nose piece carrying thereon a ball member depending from a stem arranged substantially vertically relatively to the vehicle, a pair of spring blades attached to said nose piece, one on each side thereof and free to bend on each side of a mean position, a rotatable member carrying two screws, one right handed and the other left handed, nut members attached to each spring blade to engage respectively said screws, a casing of non-circular section forming a guide member in which said nut members are adapted to slide non-rotatably, said casing closed at its lower end to form a lubricant chamber, and extensions of said nuts projecting from the upper end of said chamber for attachment to said spring blades, substantially as set forth.

In testimony whereof I have signed my name to this specification in the presence of two subscribing witnesses.

WILFRID LAWSON SPENCE.

Witnesses:
  NORMAN WISHART,
  WILLIAM JAMES WISHART.